United States Patent [19]
Grant et al.

[11] Patent Number: 5,528,584
[45] Date of Patent: Jun. 18, 1996

[54] HIGH PERFORMANCE PATH ALLOCATION SYSTEM AND METHOD WITH FAIRNESS INSURANCE MECHANISM FOR A FIBER OPTIC SWITCH

[75] Inventors: Robert H. Grant; Bent Stoevhase; Robin Purohit, all of Toronto; Gregory T. Sullivan, Brampton; David Book, Thornhill, all of Canada

[73] Assignee: Hewlett-Packard Company, Palo Alto, Calif.

[21] Appl. No.: 330,273

[22] Filed: Oct. 27, 1994

[51] Int. Cl.⁶ .................................................. H04J 14/08
[52] U.S. Cl. ........................ 370/58.2; 370/60.1; 359/117
[58] Field of Search ......................... 370/54, 58.1, 58.2, 370/58.3, 60, 60.1, 61, 94.1, 94.2; 359/117

[56] References Cited

U.S. PATENT DOCUMENTS

| | | | |
|---|---|---|---|
| 5,291,482 | 3/1994 | McHarg et al. | 370/60 |
| 5,412,648 | 5/1995 | Fan | 370/60 |
| 5,418,779 | 5/1995 | Yemini et al. | 370/54 |

*Primary Examiner*—Melvin Marcelo
*Attorney, Agent, or Firm*—Richard F. Schuette

[57] ABSTRACT

A fiber optic switch interconnects fiber optic channels so that a fiber optic network can be implemented. Channel modules provide ports (p1–pi) for connection of the fiber optic channels. Each channel module has a receive memory for temporarily storing incoming data frames from the fiber optic channels associated therewith. A switch module having a data distribution network interconnects each of the channel modules and permits ultimate connection of a source channel to a destination channel. A path allocation system, which controls the switch module, allocates the data paths between the channels. The path allocation system has a scheduler which maintains a destination queue ($Q_{p1}$–$Q_{pi}$) for each of the channels, a sentry which determines when a new data frame is ready to be routed, and an arbitrator which arbitrates port availability and which grants transfer requests proposed by the scheduler. Significantly, the arbitrator is equipped with fairness insurance mechanisms for insuring that transfer requests are always timely and efficiently serviced.

26 Claims, 9 Drawing Sheets

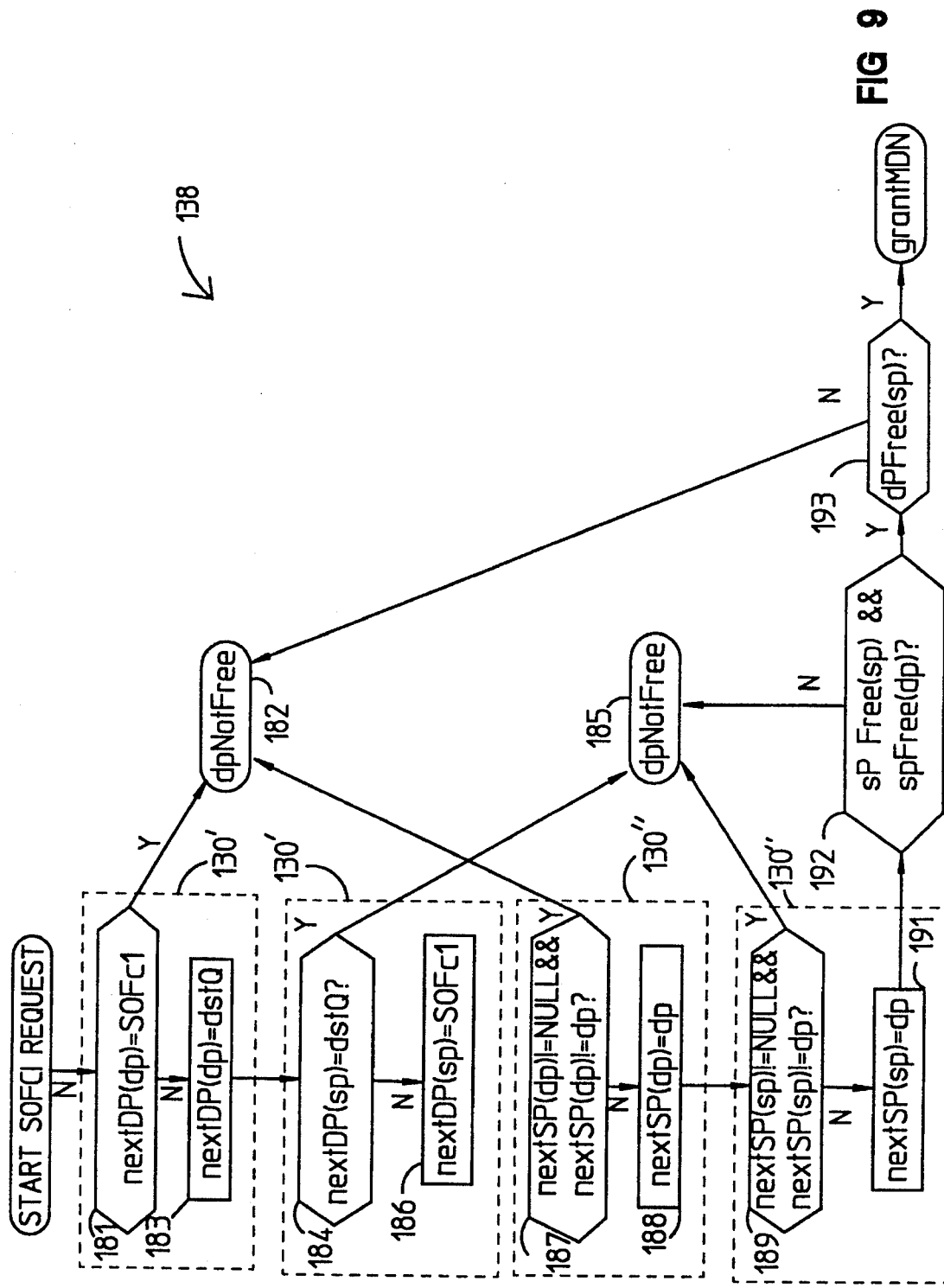

HIGH PERFORMANCE PATH ALLOCATION SYSTEM AND METHOD WITH FAIRNESS INSURANCE MECHANISM FOR A FIBER OPTIC SWITCH

FIELD OF THE INVENTION

The present invention generally relates to data communications and fiber optic networks, and more particularly, to a flexible high performance path allocation system and method for allocating data paths among fiber optic ports through a fiber optic switch for a fiber optic network, while providing a fairness insurance mechanism for insuring that all data transfer requests will ultimately be serviced by the fiber optic switch without reliance on probabilities of port availability,

BACKGROUND OF THE INVENTION

A data communications network generally includes a group of interconnected communication channels which provides intercommunication among a combination of elements or devices, for instance, computers, peripherals, etc. Historically, networks have been constructed by utilizing communication channels formed from coaxial cables and/or twisted pair cable configurations and interconnected via a suitable interface, or switching module.

Fiber optic cables are increasingly being used in the network industry, instead of coaxial cables and twisted pairs, because of their much broader bandwidth, better propagation properties, and other optimal transmission characteristics. Recently, the Fibre Channel protocol was developed and adopted as the American National Standard For Information Systems (ANSI). The Fibre Channel industry standard is described in detail in, for example, *Fibre Channel Physical And Signalling Interface*, Rev. 4.2, American National Standard For Information Systems (ANSI) (1993). The Fibre Channel industry standard provides for much higher performance and greater flexibility than previous industry standards by allowing for variable-length data frames, or packets, to be communicated through fiber optic networks which comply with the standard.

A variable-length frame 11 is illustrated in FIG. 1. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source and destination address as well as whether the frame 11 is either control information or actual data. The header 14 is followed by variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

The Fibre Channel industry standard also provides for several different types of data transfers. A class 1 transfer requires circuit switching, i.e., a reserved data path through the network switch, and generally involves the transfer of more than one data frame, oftentimes numerous data frames, between the network elements. In contrast, a class 2 transfer requires allocation of a path through the network switch for each transfer of a single frame from one network element to another.

To date, fiber optic switches for implementing networks in accordance with the Fibre Channel industry standard are in a state of infancy. One such fiber optic switch known in the industry is ANCOR, which is manufactured by and made commercially available from IBM, U.S.A. However, the performance of the ANCOR switch is less than optimal for many applications and can be improved significantly. Moreover, the ANCOR switch is inflexible in that it provides for primarily circuit switching for class 1 transfers and is very limited with respect to frame switching for class 2 transfers.

Furthermore, most prior art fiber optic switches, if not all, allocate their ports on an as-available basis. There is generally no mechanism to insure that transfer requests through the switch are ultimately serviced by the switch. These switches rely heavily on probabilities, that is, that it is probable that a transfer request cannot be consistently denied access to a port for a lengthy period of time. However, in these prior art switches, some data frames are consistently refused access to a desired port. Moreover, this dilemma is worsened by resonances, or repetitive patterns, in the protocol of port accesses. That is, long sequences may result in a very regular periodic traffic pattern to one or more ports. If this pattern aligns with how port resources are allocated, the sequence could even end up unduly appropriating port resources and slow down other sequences.

Thus, a heretofore unaddressed need exists in the industry for new and improved systems for implementing the Fibre Channel industry standard for fiber optic networks with much higher performance than presently existing systems. Specifically, there is a significant need for a path allocation system and method for a fiber optic switch which can provide for both circuit switching and frame switching with high performance, high flexibility for a variety of applications, and insurance that transfer requests will ultimately be accommodated by the switch without reliance on probabilities of port availability.

SUMMARY OF THE INVENTION

An object of the present invention is to overcome the deficiencies and inadequacies of the prior art as noted above and as generally known in the industry.

Another object of the present invention is to provide a high performance path allocation system and method for a fiber optic switch of a fiber optic network.

Another object of the present invention is to provide a flexible path allocation system and method for a fiber optic switch which accommodate both efficient circuit switching and frame switching for class 1 and class 2 transfers, respectively, in accordance with the Fibre Channel industry standard.

Another object of the present invention is to provide a path allocation system and method for a fiber optic switch which provide for insurance so that transfer requests will ultimately be accommodated by the switch without reliance on probabilities of port availability.

Briefly described, the present invention provides for a novel path allocation system and associated methodology for effectuating high performance data transfer through a fiber optic switch in a fiber optic network. The novel path allocation system is constructed as follows. A plurality of ports are associated respectively with a plurality of fiber optic channels of the network. Each of the ports has a corresponding port intelligence mechanism, which comprises a transmitter and a receiver.

A memory interface system is associated with a plurality of the port intelligence mechanisms (or ports) for temporarily storing incoming new data frames from source ports for class 2 data transfers (frame switching). The memory interface system has bypass paths for class 1 data transfers (circuit switching).

A switch module comprises several distribution networks, including a control distribution network (CDN), a main distribution network (MDN) for data, and an intermix distribution network (IDN) for data. The switch module can selectively interconnect data paths between the memory interface systems.

A sentry communicates with the memory interface systems through the switch module. It determines when a new data frame has been received by the memory interface systems, and it solicits path data from the memory interface systems regarding new data frames.

A scheduler maintains a destination queue corresponding with each of the ports. The scheduler receives path data from the sentry after the sentry recognizes a new data frame. The path data includes, e.g., a source port indicator, a memory address, and a destination port indicator. The scheduler places path data within a destination queue corresponding with the appropriate destination port and retrieves path data from each particular destination queue based upon an order defined by the destination queue. The scheduler services the destination queues based upon an order (sequential order in the preferred embodiment) defined by glue logic.

The glue logic interacts with the port intelligence mechanisms to determine when a transmitter associated with each of the ports is busy and available (i.e., ready to transmit data to the channel and ready to receive data from the switch). Based upon the foregoing inquiries, the glue logic identifies a next destination port to be serviced and informs the scheduler of such. The scheduler then accesses the destination queue corresponding to the next destination port.

An arbitrator ultimately controls data transfers through the switch module and communicates with the scheduler and the port intelligence mechanisms. The arbitrator determines when the ports are available or are busy servicing other data transfer requests. If available, the arbitrator allows communication (class 1 transfer or class 2 transfer) of the data between ports via the main distribution network or the intermix distribution network.

In accordance with a significant feature of the present invention, the arbitrator is equipped with any number of fairness insurance mechanisms for insuring that transfer requests are timely and ultimately serviced by the destination port. A source fairness insurance mechanism and a destination fairness insurance mechanism are associated exclusively with each port. Each source and destination fairness insurance mechanism establishes an order for future access to its corresponding port, as a source of data and as a destination of data, respectively. The specification of order includes a designation of at least one port indicator. In other words, each source fairness insurance mechanism has at least one destination port which will be accorded access in the future, and similarly, each destination fairness insurance mechanism has at least one source port which will be accorded access in the future.

Furthermore, in the preferred embodiment, in order to minimize complexity and to reduce requisite memory requirements, each fairness insurance mechanism is implemented with a next-in-line indicator. The next-in-line source indicator stores only the destination port indicator of the transfer request immediately following the granted transfer request which resulted in the busy condition. Moreover, the next-in-line destination indicator stores only the source port indicator of the transfer request immediately following the granted transfer request which resulted in the busy condition. The foregoing scheme is made possible by the fact that the destination queues are serviced by the scheduler in a predetermined service queue order, which is sequential order in the preferred embodiment.

The arbitrator may further comprise a class determination mechanism for determining whether a transfer request is directed to establishing a packet transfer or a reserved path (circuit switching) transfer. In the case of a reserved path transfer, the arbitrator determines the availability of the destination port to both receive and transmit data and the availability of the source port to transmit data.

In addition to achieving all the objects as denoted previously, the present invention also has many other advantages, a few of which are indicated hereafter.

An advantage of the present invention is that the path allocation system provides for centralized control of paths, which minimizes hardware requirements and permits easy access to transfer statistics.

Another advantage of the present invention is that the path allocation system and fairness insurance mechanism are both simple in design, inexpensive to implement on a mass commercial scale, and reliable as well as efficient in operation.

Another advantage of the present invention is that the fairness insurance mechanism significantly enhances the performance and throughput of the fiber optic switch.

Other objects, features, and advantages of the present invention will become apparent to one of skill in the art upon examination of the following drawings and detailed description. All such additional objects, features, and advantages are intended to be incorporated herein.

BRIEF DESCRIPTION OF THE DRAWINGS

The present invention can be better understood with reference to the following drawings. The drawings are not necessarily to scale, emphasis instead being placed upon clearly illustrating principles of the present invention.

FIG. 9 is a flow chart illustrating the architecture and the functionality of the arbitrator of FIG. 4 in relation to a class 1 (circuit switching) data transfer.

DETAILED DESCRIPTION OF THE PREFERRED EMBODIMENT

Figure 2:
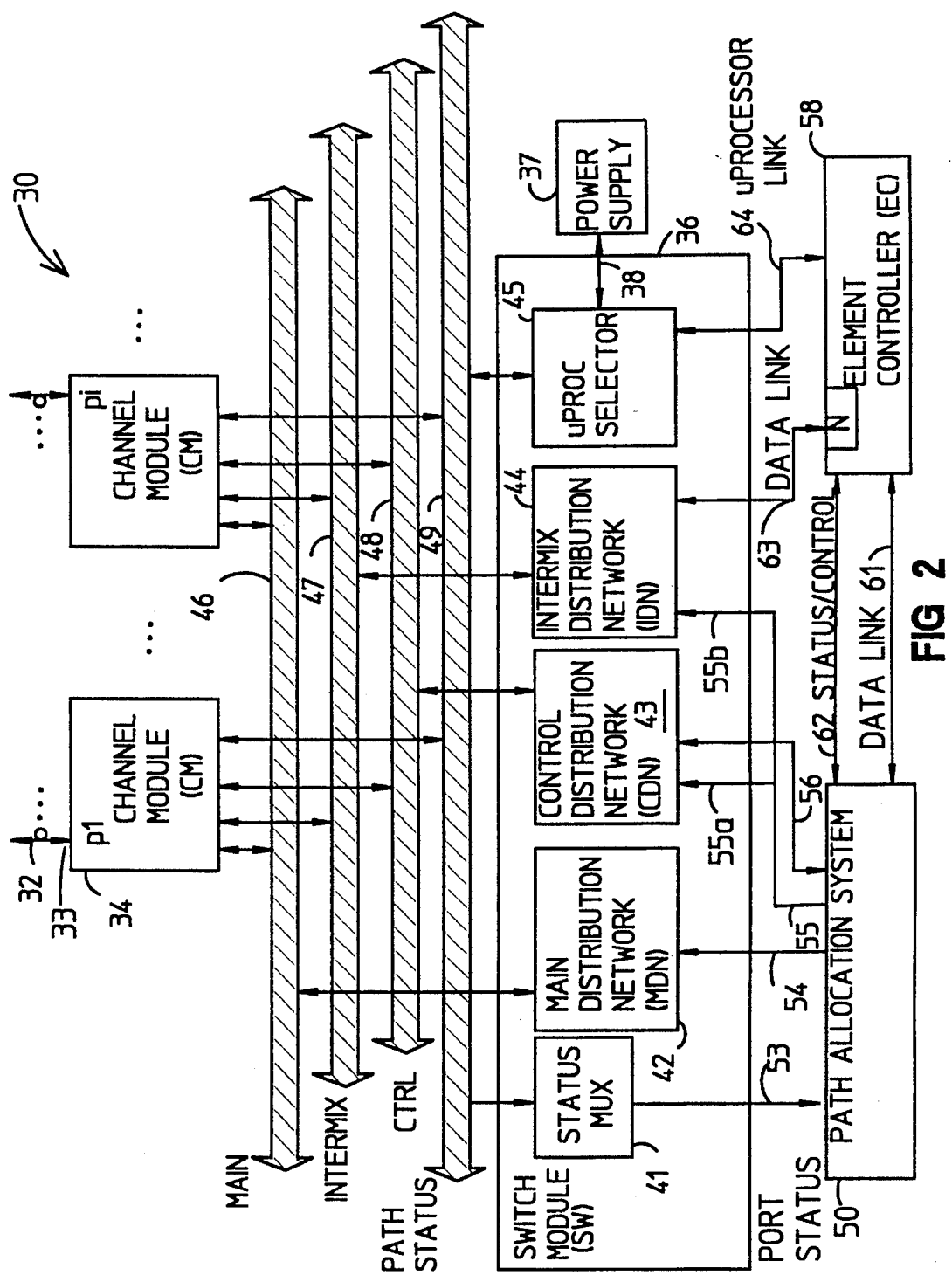
FIG. 2 is a schematic circuit diagram of a high performance fiber optic switch for a fiber optic network.

With reference now to the drawings wherein like reference numerals designate corresponding parts throughout the several views, a schematic circuit diagram of a fiber optic switch 30 is shown in FIG. 2. The fiber optic switch 30 enables implementation of a fiber optic network by permitting selective interconnection of a plurality of fiber optic channels 32. The fiber optic switch 30 is a very flexible system, permits both circuit and frame switching for class 1 and 2 data transfers, respectively, in accordance with the Fibre Channel industry standard, and is a much higher performance system than other conventional fiber optic switches.

In architecture, the fiber optic switch 30 has a plurality of channel modules 34 to which the fiber optic channels 32 are connected via respective ports (p1–pi) 33. Each channel module 34 is connected to one or more of the fiber optic channels 32. Each channel module 34 provides port intelligence for data communication with the channels, as well as bypasses for class 1 data transfers and receive memory for temporarily storing data frames for class 2 data transfers, as will be further described in detail later in this document. The channel modules 34 are connected to a switch module 36, which receives and distributes electrical energy from a power supply 37. In the preferred embodiment, the switch module 36 is implemented as part of a back plane and has disposed thereon a number of functional interface elements.

The switch module 36 has a status multiplexer (MUX) 41 which is configured to receive status signals from the channel modules 34 concerning the ports 33 and associated circuitry. The status signals include at least the following: a "new frame arrived" signal, which indicates when a new frame has been received by a receive memory 84 (FIG. 3) associated with the channel module 34; a receiver ready, or "rxready" signal, which indicates when data received from a port 33 is ready and not ready to be sent through the switch 30 from the receive memory 84 (FIG. 3); an "intermix bus ready" signal, which indicates when the IDN 44 is ready (not being used) and not ready (currently being used) to transfer data; a "port active" signal, which indicates when a port intelligence mechanism 73 (FIG. 3) associated with a port 33 is active/inactive; a "transmitter ready" signal, which indicates when a transmit memory 86 (FIG. 3) associated with a port 33 is ready and not ready to receive data (destined for a destination port 33) from the switch 30; an "intermix ready" signal, which indicates when the IDN 44 is ready and not ready to perform an intermix transfer; and a "transfer status ready," or "xfer ready," signal, which indicates when status information is ready and not ready to be transferred to the path allocation system 50 from the associated status/control logic 85 (FIG. 3) of a channel module 34.

Referring again to FIG. 2, main distribution network (MDN) 42 selectively interconnects the data paths of the channels 32. A control distribution network (CDN) 43 controls the MDN 42 and communicates control signals to the various channel modules 34. An intermix distribution network (IDN) 44 selectively interconnects intermix paths between channel modules 34. Intermix paths are a set of alternate data paths which are separate from those data paths associated with the MDN 42 and which can permit data flow between selected channels 32 while data paths of the MDN 42 are in use. Finally, a processor selector 45 can optionally be provided as part of an auxiliary system for interconnecting processors and controllers distributed throughout the fiber optic switch 30.

A path allocation system 50 is connected to the switch module 36 and, particularly, to the status multiplexer 41, the MDN 42, the CDN 43, and the IDN 44. The path allocation system 50 generally allocates data interconnect paths through the switch module 36 and between fiber optic ports 33 and determines the priority of the connections. The path allocation system 50 is a significant element of the present invention and because of its design, results in very desirable performance attributes with minimum hardware requirements, as will be further described in detail later in this document.

Also optionally connected to the switch module 36 is an element controller (EC) 58. The element controller 58 essentially provides servers, for example, a name server, a time server, etc. for the interface system 30. The element controller 58 has a data link 61 with the path allocation system 50 for communicating server information and a status/control connection 62 for exchanging status/control signals with the path allocation system 50. The element controller 58 also exchanges initialization and/or configuration information with the CMs 34 and the microprocessor selector 45 via connection 64.

Figure 3:
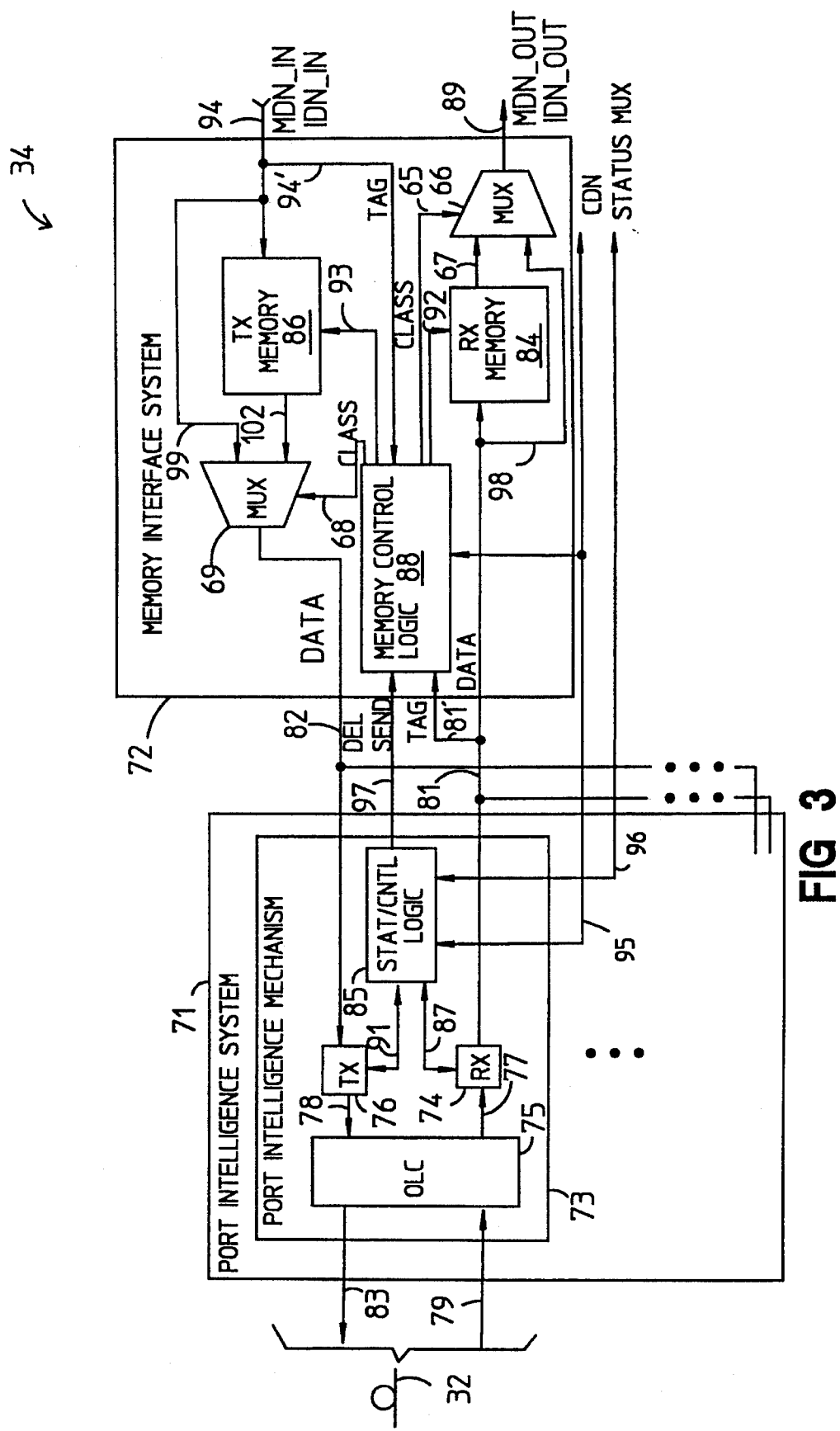
FIG. 3 is a schematic circuit diagram of a channel module (CM) within the fiber optic switch of FIG. 2.

Preferably, each of the channel modules 34 is constructed as indicated in the schematic circuit diagram of FIG. 3. With reference to FIG. 3, each channel module 34 comprises a port intelligence system 71 connected to a memory interface system 72. In the preferred embodiment, the port intelligence system 71 has one or more port intelligence mechanisms 73. One port intelligence mechanism 73 is allocated to each fiber optic channel 32. Each port intelligence mechanism 73 has a receiver (RX) 74, a transmitter (TX) 76, an optical link card (OLC) 75, and a status/control (STAT/CNTL) logic 85. The receiver 74 and the transmitter 76 are adapted to receive and transmit data, respectively, through their corresponding input and output fibers 79, 83 (shown collectively in FIG. 2 as channel 32) in accordance with the Fibre Channel industry standard protocol and at the channel's particular bit rate.

The OLC 75 is utilized to directly interface the port intelligence mechanism 73 to the fiber optic channel 32. The OLC 75 provides an optical-to-electrical conversion as well as a serial-to-parallel conversion between the input fiber 79 of the channel 32 and the receiver 74. Furthermore, the OLC 75 provides an electrical-to-optical conversion as well as a parallel-to-serial conversion between the output fiber 83 of the channel 32 and the transmitter 76. The OLC 75 can be any suitable conventional optical link card: for example but not limited to, a model OLC266 manufactured by and commercially available from IBM Corp., U.S.A., or a model MIM266 manufactured by and commercially available from ELDEC, Inc., U.S.A.

The status/control logic 85 monitors and controls both the receiver 74 and the transmitter 76, as indicated by corresponding bidirectional control connections 87, 91. Further, the status/control logic 85 exchanges control signals on control connection 95 with the CDN 43 (FIG. 2), provides status signals on connection 96 to the status MUX 41 (FIG. 2) indicative of, e.g., whether the corresponding port 33 is available or busy: and forwards control signals to the memory interface system 72 via connection 97. The status/control logic 85 further recognizes when a new frame is received by the receiver 74 and determines the transfer class (either 1 or 2) as well as the length of data pertaining to each new frame. It should be noted that a frame could have no data, as for example: in the case of an SOFc1 frame, which is initially passed through the switch 30 for setting the switch 30 up to reserve a bidirectional path for a class 1 data transfer.

The memory interface system 72 is connected in series, or cascaded, with the port intelligence system 71, and particularly, with each port intelligence mechanism 73 contained therein. The memory interface system 72 generally provides class 1 bypass data connections 98, 99 for class 1 data transfers and provides temporary storage for class 2 data transfers. For data storage relative to class 2 data transfers, the memory interface system 72 has a receive memory (RX MEMORY) 84 for source data, a transmit memory (TX MEMORY) 86 for destination data, and memory control logic 88 for controlling the receive and transmit memories 84, 86. The receive memory 84 and the transmit memory 86 may be partitioned into a number of individual buffers or memory blocks, if desired.

Figure 1:
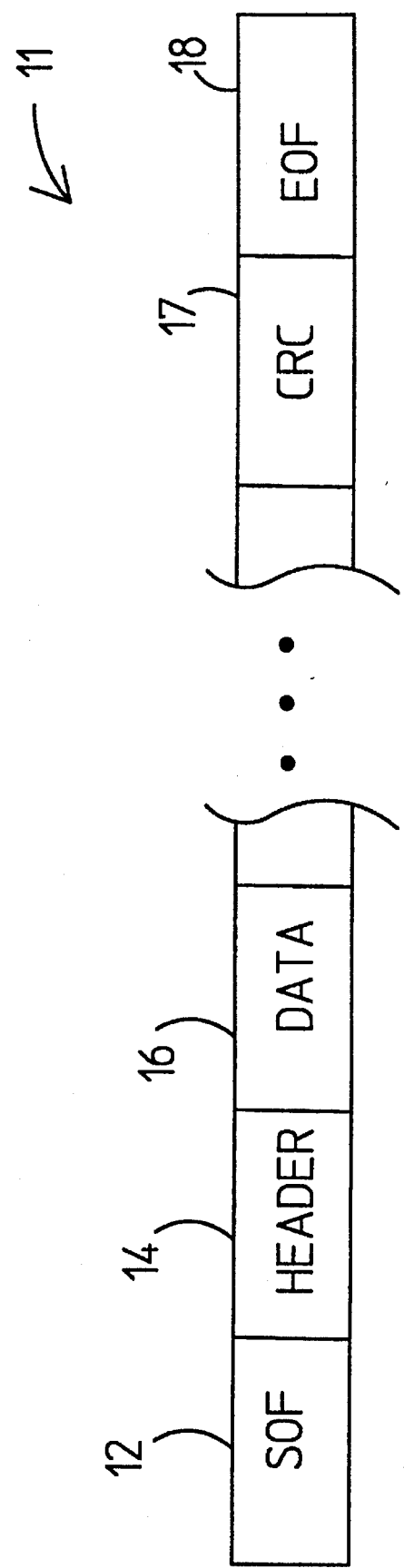
FIG. 1 is a schematic diagram of a variable-length frame communicated through a fiber optic switch of a fiber optic network in accordance with the Fibre Channel industry standard.

When incoming class 1 source data is received by the memory interface system 72 from the port intelligence system 71, the source data bypasses the receive memory 84 via successively bypass data connection 98, MUX 66, and data connection 89. The data connection 89 introduces the source data to the data buses of the MDN 42 or the IDN 44 of the switch module 36. The memory control logic 88 receives a tag 81' from the receiver 74 indicative of either a class 1 or class 2 data transfer and controls the MUX 66 accordingly on class control connection 65. The receiver 74 generates the tag 81' based upon the header 14 (FIG. 1) on the incoming data. In the preferred embodiment, two-bit tags are used. A tag "00" indicates nonuse. A tag "01" indicates data. A tag "10" indicates either SOF or EOF for a class 1 data transfer. A tag "11" indicates either SOF or EOF for a class 2 data transfer.

When incoming class 2 source data is received by the memory interface system 72 (as well as an SOFc1 frame), as is determined by the memory control logic 88 via tag 81', the receive memory 84 reads and stores the source data from the receiver 74 via data connection 81 under the control of the memory control logic 88. Moreover, when the timing is appropriate, the receive memory 84 writes data to the data buses of the MDN 42 or the IDN 44 of the switch module 36 via data connection 67, MUX 66, and data connection 89 under the control of the control logic 88. In order to transfer data from the receive memory 84 to the data buses, the CDN 43 (FIG. 2) communicates a send control signal 95 to the status/control logic 85, and the status/control logic 85 in turn forwards a send signal via control connection 97 to the memory control logic 88. The send signal from the status/control logic 85 designates the length of the data frame to be sent. Based upon the send signal the memory control logic 88 controls the receive memory 84 via control connection 92 and controls the MUX 66 with class control connection 65 so that the MUX 66 communicates data from the receive memory 84 to the data connection 89. If desired, the CDN 43 can also delete frames within the receive memory 84 by sending a delete signal (del) to the status/control logic 85, which in turn forwards the delete command to the memory control logic 88 via control connection 97.

Destination data intended for a destination port 33 from the data buses of the MDN 42 or the IDN 44 is made available to the transmit memory 86, as indicated by data connection 94, and the MUX 69, as indicated by the bypass data connection 99. A two-bit tag on tag connection 94', similar to the two-bit tag on tag connection 81', informs the memory control logic 88 when the destination data corresponds to either a class 1 data transfer or a class 2 data transfer. When class 1 destination data is received, the memory control logic 88 controls the MUX 69 via control connection 68 so that the MUX 69 channels the destination data directly to the transmitter 76 of the appropriate port intelligence mechanism 73 via data connection 82, thereby effectively bypassing the transmit memory 86. In contrast, when class 2 destination data is received by the memory interface system 72, the memory control logic 88 controls the transmit memory 86 to store the incoming destination data via data connection 94. When timing is appropriate, the destination data is then ultimately forwarded to the transmitter 76 of the appropriate port intelligence mechanism 73 via successively data connection 102, MUX 69, and data connection 82, under the control of the memory control logic 88.

Figure 4:
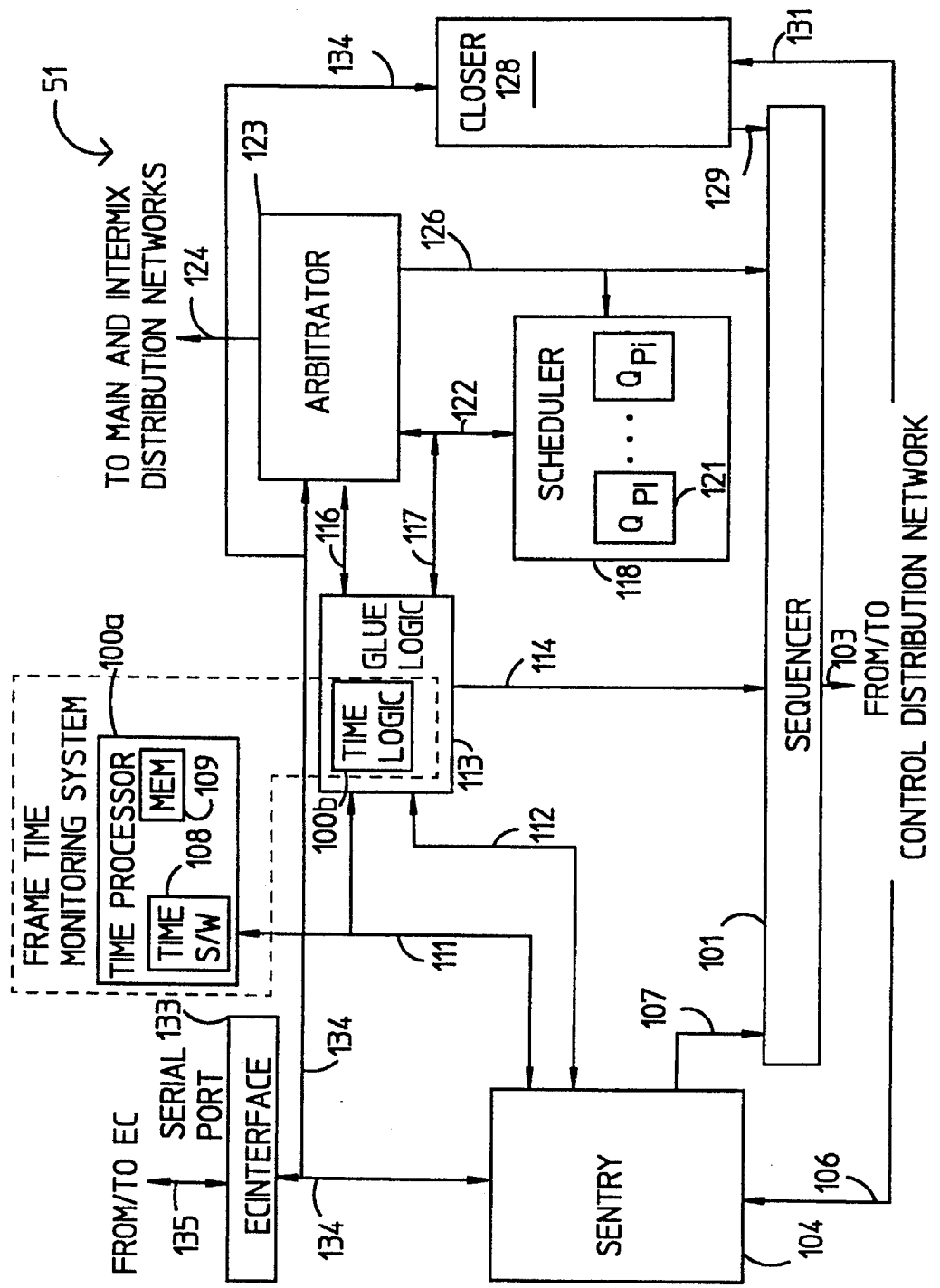
FIG. 4 is a schematic circuit diagram of a novel path allocation system within the fiber optic switch of FIG. 2.

A preferred embodiment of the novel path allocation system 50 of FIG. 2 is illustrated in detail in FIG. 4. As mentioned, the path allocation system 50 allocates the data paths through the switch module 36 with high performance. In architecture, the preferred embodiment of the path allocation system 50 has the following elements, as is illustrated in FIG. 4. A sequencer 101 is connected to the CDN 43 via a control connection 103. A sentry 104 communicates to the CDN 43 via the control connection 106 and is connected to the sequencer 101 via the control connection 107. A timer 108 communicates to the sentry 104 and glue logic 113 via a control connection 111. The glue logic 113 communicates control signals with the sentry 104 via the control connection 112, and communicates control signals to the sequencer 101 via the control connection 114. The scheduler 118 maintains a plurality of destination queues ($Q_{p1}$–$Q_{pi}$) 121 which correspond respectively with each of the ports (p1–pi) 33. The scheduler 118 communicates with the glue logic 113 via connections 117, 122.

An arbitrator 123 is connected to the scheduler 118 via the connection 122, is connected to the glue logic 113 via the connection 116, is connected to the sequencer 101 via the connection 126, and communicates to the NDN 42 and IDN 44 via the data connection 124. A closer 128 monitors the sequencer 101 via the connection 129, receives control signals from the CDN 43 via the control connection 131, and communicates to the sentry 104, the arbitrator 123, and an element controller (EC) interface 133 via the connection 134. The EC interface 133 communicates via a serial connection 135 with the element controller 58 (FIG. 2).

The sequencer 101 can be implemented with any suitable logic, for example, as a state machine(s) in a conventional field programmable gate array (FPGA) with the functionality as set forth hereafter. The sequencer 101 serves as the primary interface to the CDN 43 via the control connection 103. It essentially arbitrates the CDN 43 among the sentry 104, the arbitrator 123, and the closer 128.

The sentry 104 can be constructed with any suitable logic, for example, as a state machine(s) in an FPGA. It monitors the new frame status (new frame arrived signal) corresponding with the ports 33 via the status MUX 41 (FIG. 2) and status/control logic 85 (FIG. 3) and determines when a new frame is available for routing through the MDN 42 of the switch module 36. In essence, the sentry 104 collects data of validated, buffered framess maps the destination port identification (DID) from the header (FIG. 1) of an incoming frame to an appropriate port 33 via a routing table(s), determines the appropriateness of a new frame for a destination port 33 (i.e., whether the frame can be intermixed onto a class 1 stream), and determines whether a new frame is proper or in error.

The sentry 104 and timer 108, together, further provide queue command information to the scheduler 118, via the glue logic 113 and connections 112, 117, 122. The queue command information can include an add signal, a frame busy (fbsy) signals and a delete (del) signal. The add signal is sent when a new frame is within the receive memory 84 of the memory interface system 72 and is ready to be routed through the fiber optic switch 30. When an add signal is sent from the sentry 104 to the scheduler 118, the following information is sent: the add command, the destination port (or queue), a tail pointer, a class indicator, the source port, source buffer number, head pointer.

The fbsy signal is sent when the new frame has resided in the receive memory 84 for a predetermined time period (fbsy time period) which is considered too lengthy for the system. The fbsy signal which is sent by the sentry 104 to the scheduler 118 generally includes same information as the add signal, as delineated previously.

The delete signal is sent when the frame has resided in the receive memory 84 for another predetermined time period (delete time period), which is longer than the fbsy time period, and which warrants deletion of the frame. A delete signal may also be issued for other error conditions. The delete signal which is sent by the sentry 104 to the scheduler 118 includes the following path data: (a) the delete command, (b) the source port, and (c) the source buffer number.

The timer 108 can be implemented with any conventional processing mechanism, for instance, a digital signal processor (DSP). The timer 108 measures the time in which a new frame resides within the receiver memory 84 of a channel module 32 and determines when an fbsy signal and when a delete signal should be asserted by the sentry 104. For this purpose, the timer 108 maintains internally an fbsy/del clock for tracking the fbsy time period and the delete time period for each new frame. The timer 108 receives an initiate (init) signal 111 from the sentry 104 on connection 111 for starting the fbsy/del clock when a new frame is ready to be transferred from a port 33, receives a timer clear (clr) signal from the arbitrator 123 via glue logic 113 and via connections 116, 111 for the purpose of clearing the fbsy/del clock, and outputs the fbsy signal and the delete signal to the sentry 104 via connection 111 after, respectively, an fbsy time period and a delete time period, provided that no timer clear signal has been received from the arbitrator 123. The timer clear signal essentially terminates the fbsy/del clock of the timer 108.

The glue logic 113 primarily serves as an interface among the sentry 104, the timer 108, the sequencer 101, the arbitrator 123, and the scheduler 118. In the preferred embodiment, the glue logic 113 is implemented as a state machine(s) via an FPGA or other suitable logic. The glue logic 113 also performs other functionality in the preferred embodiment. The glue logic 113 monitors transmission ready (txready) signals and intermix ready signals through the sequencer 101, which indicate when a port intelligence mechanism 73 is ready to receive a data frame. The glue logic 113 performs a circular sequence wherein it searches in sequence through those txready and intermix ready signals which are asserted, by masking out those which are deasserted, to determine the next destination port 33 which is to receive data (as well as the next destination queue 121 to service). The glue logic 113 forwards the identity of the next destination port 33 to be serviced to the scheduler 118 via connections 117, 122. In this regard, the glue logic 113 forwards a word to the scheduler 118 comprising a base pointer address, which identifies the heads of double link list queues, and a destination queue indicators which identifies a particular destination queue.

The scheduler 118, which can be implemented with any convention processing mechanisms such as a DSP, maintains and manages the destination queues ($Q_{p1}$–$Q_{pi}$) 121 and receives the queue management commands, particularly, an add signal, a fbsy signal, and a delete signal, from the sentry 104. The scheduler 118 also receives a next destination port signal via connections 117, 122, from the glue logic 113, The next destination port signal indicates the next port 33 to service (and hence, the next destination queue 121 to service).

The scheduler 118 maintains and updates a destination queue ($Q_{p1}$–$Q_{pi}$) 121 for each of the fiber optic ports (p1–pi) 33 and is configured to store queue entries associated with each corresponding port 33. Each queue entry has path data which identifies the following: (a) source port 33 from which data is to be transferred from, (b) the source buffer number in receive memory 84 where the frame is located, and (c) flags which indicate whether the queue entry is a normal frame entry, a frame for starting a class 1 data transfer ("SOFc1") entry, a Q-Head entry, or a Q-tail entry. Each of the queue entries is related by a link list, preferably a double or multiple link lists wherein each queue entry is associated with a backward link for designating a previous queue entry (via previous source port and buffer number) and a forward link for designating a subsequent queue entry (via next source port and buffer number). The double link lists provide an easy way to construct and manipulate queues, while minimizing hardware requirements.

When the scheduler 118 receives path data pertaining to a new frame from a port intelligence mechanism 73 via an add signal from the sentry 104, the scheduler 118 stores the path data in an appropriate destination queue 121, along with a forward and backward link.

When the scheduler 118 writes out data from the queues 121, it does so in an order defined by the glue logic 113. Moreover, when the scheduler 118 writes out path data from a particular destination queue 121, the scheduler 118 retrieves the queue entries from the destination queue 121 in an order defined by the link list associated therewith and then sends a request to transfer the new frame between the source port 33 and the destination port 33 to the arbitrator 123, which in turn causes the switch module 36 to interconnect the appropriate data path via the MDN 42 if the involved ports are ready.

When the scheduler 118 receives an fbsy signal corresponding to a frame from the sentry 104, the scheduler 118 takes the queue entry associated with the fbsy signal and moves the queue entry to the destination queue 121 corresponding to the source port 33 where the data frame originated, so that the data frame is eventually returned to the port 33 from which it came.

When the scheduler 118 receives a delete signal corresponding to a frames the scheduler 118 will delete the queue entry associated with the frame. Note that the frame which is deleted was previously put into the queue corresponding to the source port 33 where the frame originated by virtue of the fbsy signal from the sentry 104.

The arbitrator 123 is implemented with any suitable logics preferably a state machine(s) implemented with an FPGA. The arbitrator 123 tracks the status of the port intelligence mechanisms 73, determines when the port intelligence mechanisms 73 are available for transmitting and receiving data, and arbitrates connections between the port intelligence mechanisms 73. Specifically, the arbitrator 123 monitors transmission ready (txready), intermix ready, intermix bus ready, and receive ready (rxready) signals generated by the status/control logic 85 (FIG. 3) of the port intelligence mechanisms 73. When the arbitrator 123 receives a transfer request signal from the scheduler 118 to transfer data from a particular source port 33 to a particular destination port 33, the arbitrator 123 determines whether the transfer is either class 1 (circuit switching) or class 2 (frame switching).

If a class 1 transfer is to be effectuated, then the arbitrator 123 determines if both the particular source port 33 and the destination port 33 are available for both transmitting and receiving data, because a class 1 transfer is bidirectional and requires a reserved data path through the switch 30. If a class 2 transfer is to be effectuated, then the arbitrator 123 determines whether the particular source port 33 is ready to transfer and whether the particular destination port 33 is available for receiving a data frame.

When the ports 33 are not ready to make the transfer (either in class 1 or class 2), then the arbitrator 123 refuses the scheduler's transfer request, and the scheduler 118 revisits the transfer request later using any suitable algorithm, until the transfer request is ultimately granted. Once a transfer request has been granted by the arbitrator 123, the arbitrator 123 controls the MDN 42 (FIG. 2) so that the MDN 42 connects the appropriate source port 33 to the appropriate destination port 33. Moreover, after or when the data transfer has been authorized by the arbitrator, the arbitrator 123 forwards a scheduler clear signal to the scheduler 118 so that the scheduler 118 eliminates the associated queue entry from the corresponding link list queue.. The arbitrator 123 also forwards a timer clear signal to the timer 108 in order to clear the timer's internal fbsy/del clock for the data frame being transferred.

The arbitrator 108 can be implemented in many different ways to achieve the functionality as previously described. However, a preferred architecture and methodology for the arbitrator 108 is set forth hereafter. The arbitrator described hereafter is desirable because it implements a fairness insurance algorithm to insure fairness in the allocation of resources so that no one request 121 from the scheduler 104 can be consistently refused. In other words, the arbitrator insures that every transfer request is serviced in a timely manner and does not rely on probabilities.

FAIRNESS INSURANCE ALGORITHM

The fairness insurance algorithm insures that every data transfer request through the fiber optic switch 30 will always eventually get serviced so that its corresponding data is routed through the switch 30 from one port 33 to another port 33. If ports 33 were allocated for the transfers strictly on an as-available basis, which is generally the case in most prior art embodiments, some data may be consistently refused access to a desired port 33. This dilemma can be worsened by resonances, or repetitive patterns, in the protocol of port accesses. That is, long sequences may result in a very regular periodic traffic pattern to one or more ports 33. If this pattern aligns with how port resources are allocated, the sequence could end up unduly appropriating port resources and slow down other sequences.

An example of a very effective fairness insurance algorithm which can be employed in the arbitrator 123 will now be described. This fairness insurance algorithm involves insuring that data is ultimately forwarded to a port by establishing a sequence for access to the port which includes the denied transfer request. This sequence can be implemented with, for example, a queue or some other indication mechanism. Moreover, the sequence can implement any desirable ordering algorithm or methodology.

However, in the preferred embodiment, the sequence is simply, yet effectively, implemented with a single "next-in-line" indicator. Specifically, a "next-in-line" destination indicator identifies a transfer request which is "next-in-line" for a particular port as a destination port. There is also a "next-in-line" source indicator which identifies a transfer request that is "next-in-line" for each port as a source port. In essence, if a frame transfer request is denied access to a port (source or destination) and no other frame transfer request is presently in line for access to that port, then the denied frame transfer request will be the "next-in-line" for access to that port. Subsequent frame transfer requests requiring the same port are denied access, regardless of whether the port is available or not at the time of the subsequent frame transfer requests. The system works by storing only the next-in-line transfer request and not subsequent frame transfer requests, because the destination queues are serviced in a prescribed order, which is sequential order in the preferred embodiment. Finally, it should be noted that because only the identification for the next-in-line transfer request is retained, memory requirements and complexity are optimally minimized.

As will be further described in detail hereinafters to accommodate both class 1 and 2 data transfers, the next-in-line indicators (destination and source) associated with the ports 33 are set as follows. The next-in-line destination indicator for a port 33 can be set to either of the following: (a) "dstQ", indicating a frame in that port's destination queue is next-in-line, or (b) "SOFc1", indicating a class 1 transfer in that port's rx (pitcher) side. Furthermore, the next-in-line source indicator for a port 33 can be set to any of the following: (a) "empty" or (b) a particular destination queue 121.

Figure 5:
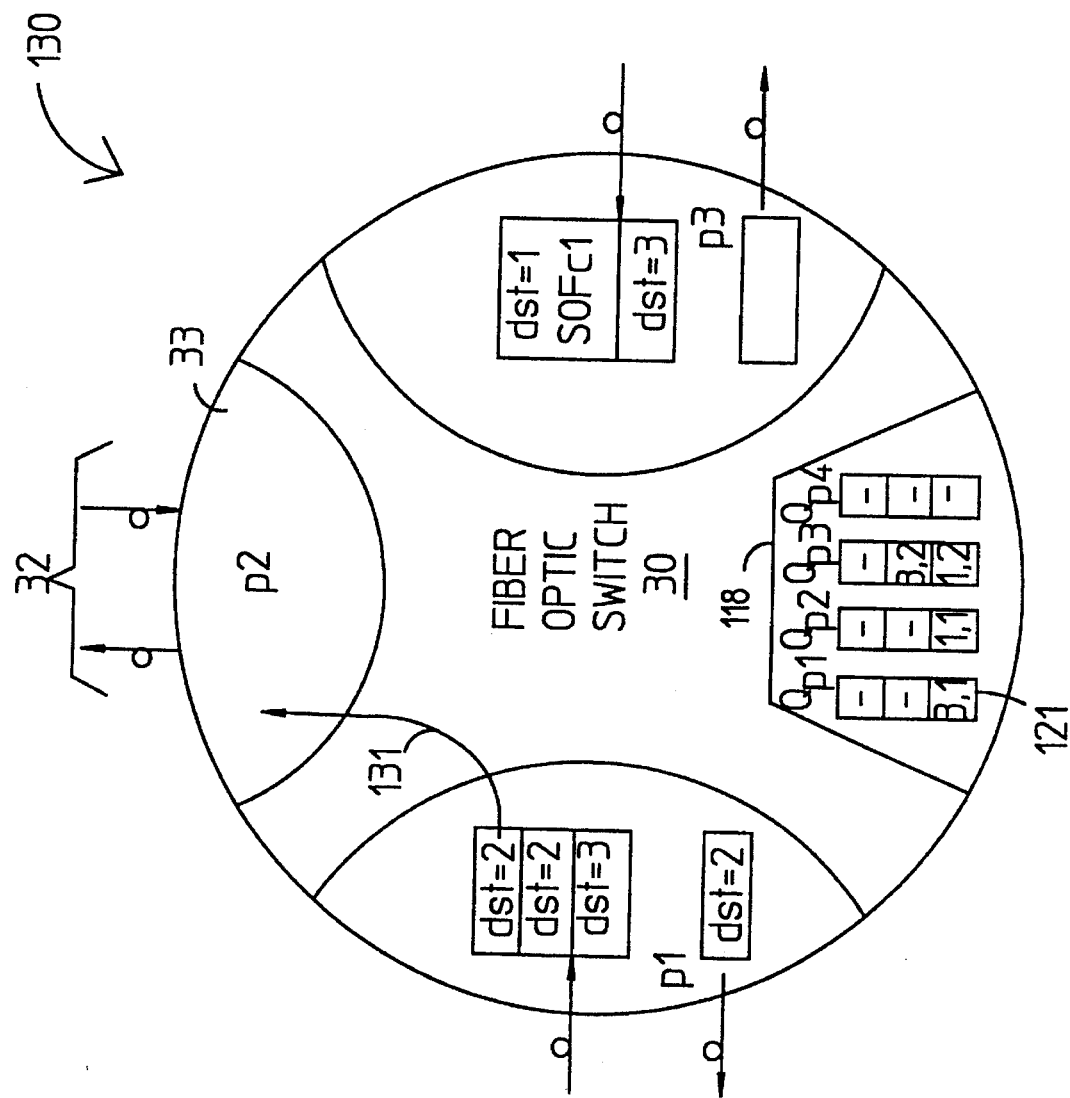
FIG. 5 is a schematic diagram illustrating a fairness insurance algorithm which is employed within an arbitrator of FIG. 4.

FIG. 5 illustrates an example of a data routing scenario for better understanding the fairness insurance algorithm, particularly the next-in-line fairness insurance algorithm denoted generally by reference numeral 130. In FIG. 5, a data transfer, indicated by reference arrow 131, is currently in progress, while four other data frames compete in the fiber optic switch 30 for future access to various ports 33. As shown in the scheduler queues 121, a frame (frame "1,1" in queue $Q_{p2}$; first frame digit indicates source port and second frame digit indicates buffer, or memory block, at the source port) from port p1 and destined for port p2 competes with another frame (frame "1,2" in queue $Q_{p3}$) from port p1 and destined for port p3. Port p1, however, is already forwarding a frame so neither of the foregoing transfer requests is granted at this point. Since queue service is accorded sequentially through the queues corresponding with destination ports 33 which are available, queue $Q_{p3}$ will be serviced just after the transfer grant accorded queue $Q_{p2}$ and which is denoted by reference numeral 131. Thus, queue $Q_{p3}$ will be next-in-line for port p1 as a source port, and the next-in-line source indicator for p1 will designate queue $Q_{p3}$ (described more succinctly, "nextSP[1]=3").

Things become even more complicated with a class 1 data transfer (denoted as "SOFc1" in FIG. 5). A class 1 data transfer requires not only the tx (receives data) side of the destination port 33, but also the tx side of its source port 33. Hence, the class 1 data transfer at source port p3 and destined for port p1 must wait until the frame destined for port p3 is forwarded. This is done by establishing the SOFc1 transfer at port p3 as the next-in-line for port p3 as a destination port by setting the next-in-line destination indicator for port p3 as "SOFc1" (indicating a class 1 transfer in that port's rx (pitcher) side). Moreover, frame "1,2" in queue $Q_{p3}$ of FIG. 5 is also next-in-line for port p3 as a destination port, indicated by "nextDP[3]=dstQ".

Deleting a queue entry in a queue 121 within the scheduler 118 can be particularly troublesome once the fairness insurance algorithm is employed. For instance, suppose that frame "1,2" in queue $Q_{p3}$ is deleted. Not only must the frame "1,2" be deleted from the head of the queue $Q_{p3}$, but it must also be eliminated from the next-in-line source and destination indicators corresponding with the ports 33. If not, a "deadly embrace" might occur. For instance, suppose frame "3,1" (i.e., the SOFc1 transfer) in queue $Q_{p1}$ was designated by the next-in-line source indicator for port p3 (i.e., nextSP[3]=1). It will be blocked, however, by the nextDP[3]=dstQ. If frame "1,2" in queue $Q_{p3}$ is deleted, then the frame "3,2" destined for port p3 now has access to the next destination port, but cannot obtain access to its desired source port. Moreover, frame "3,1", which has access to the next source port, cannot obtain the desired next destination port. This adverse condition can subsist indefinitely.

PREFERRED ARBITRATOR EMPLOYING FAIRNESS INSURANCE MECHANISMS

FIGS. 6 through 9 are flow charts illustrating the architecture and the methodology of the preferred arbitrator 108, which employs the fairness insurance algorithm, described in the previous section, at various junctures in its operation. The functionality set forth in these figures can be accomplished in hardware, software, or a combination thereof. However, in the preferred embodiment, the arbitrator 108 is implemented in high speed hardware as a number of logical state machines in communication with a number of register/memory arrays. Specifically, a state machine is utilized to implement the methodology in each of the flow charts of FIGS. 6 through 9, and the register/memory arrays are configured to store the next-in-line source and destination indicators as well as other necessary data as is clear from the following discussion.

Figure 6:
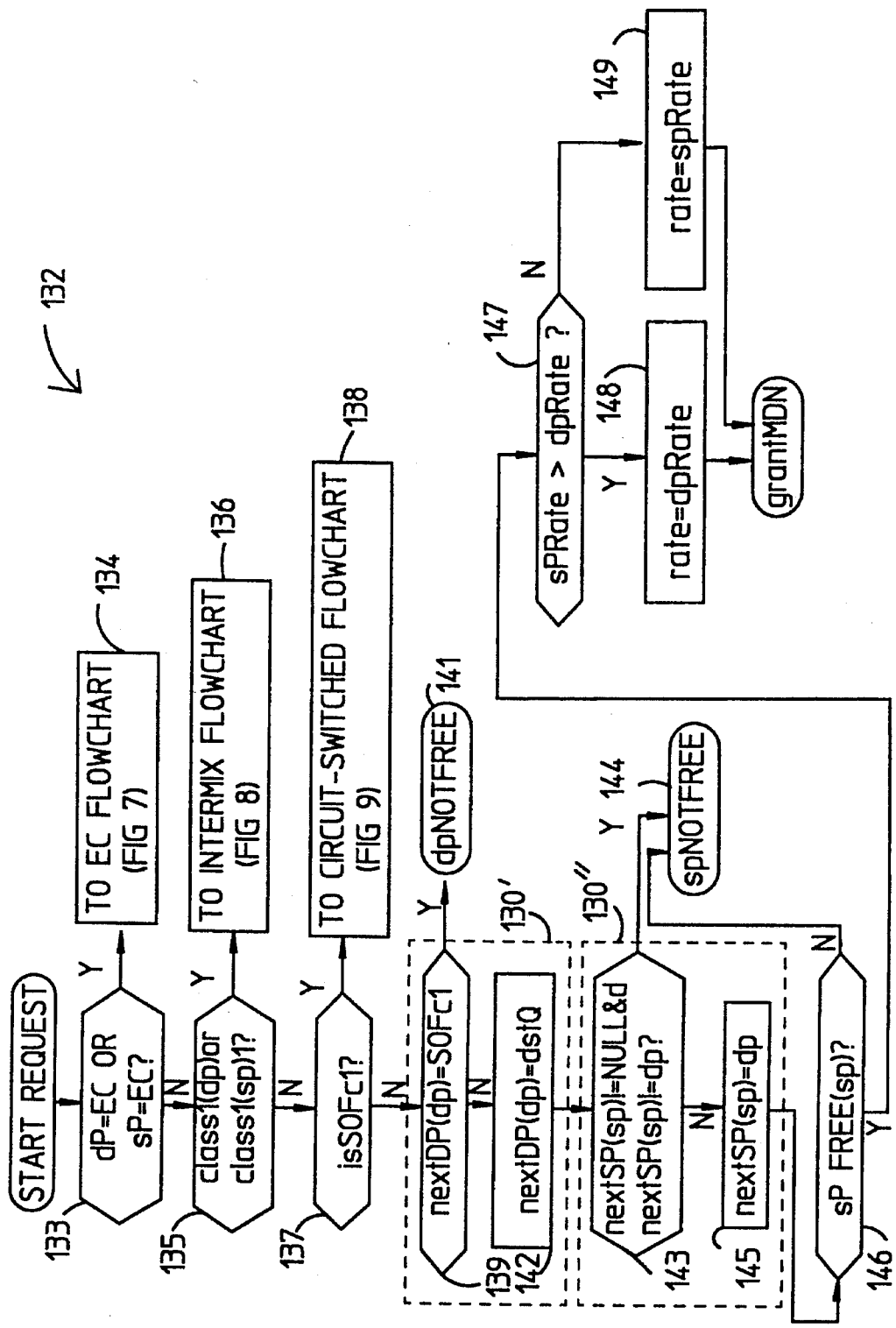
FIG. 6 is a high level flow chart illustrating the architecture and functionality of the arbitrator of FIG. 4.

The flow chart 132 of FIG. 6 shows the high level methodology and is executed by the arbitrator 123 for each transfer request issued from the scheduler 104 via connection 122 (FIG. 4). In the flow charts of FIGS. 6 through 9, transfer requests can be granted by the arbitrator 123 for use of the MDN 42 ("grantMDN") or the IDN 44 ("grantIDN"). Transfer requests can be denied by the arbitrator 123 for use of a port 33 as a destination ("dpNotFree"), for use of a port 33 as a source ("spNotFree"), and for use of the IDN 44 ("imixNotFree").

Figure 7:
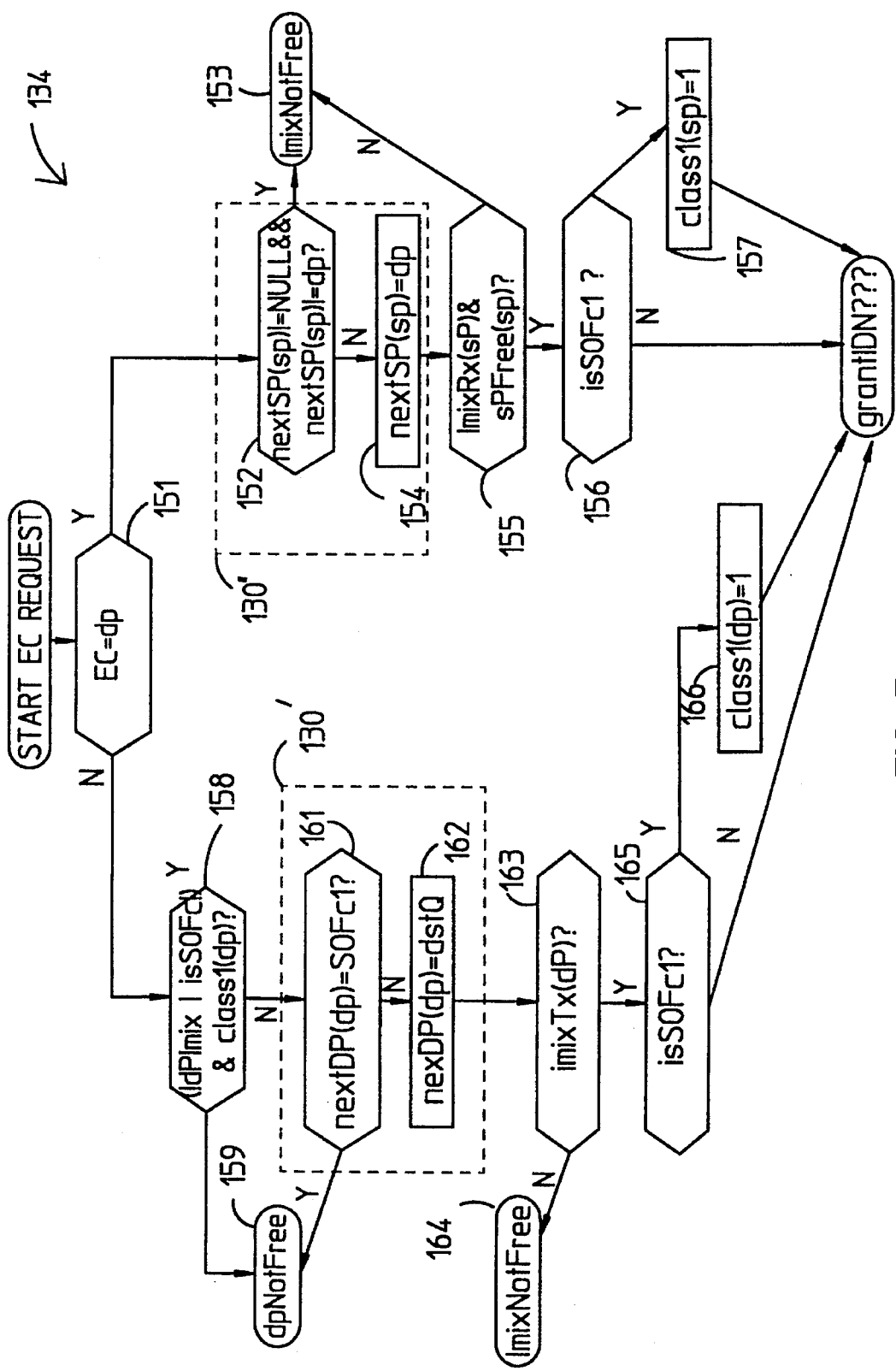
FIG. 7 is a flow chart illustrating the architecture and the functionality of the arbitrator of FIG. 4 in relation to an element controller (EC) of FIG. 3.

Initially, as indicated at a flow chart block 133, a determination is made as to whether the transfer request from the scheduler 118 involves the element controller (EC) 58 as a destination or source of data ("dp=EC or sP=EC?"). If so, then the methodology set forth in FIG. 7 is pursued and performed by the arbitrator 108, as indicated by the flow chart block 134.

If the data transfer request does not involve the EC 58, then the arbitrator 108 determines whether the transfer request involves use of the IDN 44, as indicated in a flow chart block 135. In essence, the question is whether the source port or the destination port is already involved in a class 1 transfer ("class1[dp] or class1[sp]1?"), which involves the reservation a data path. The IDN 44 is utilized for transfer of data when the MDN 42 is unavailable due to the class 1 transfer. If an intermix connection is to occur, then the arbitrator exhibits the functionality and performs the methodology set forth in FIG. 8, as denoted at the flow chart block 136.

If the IDN 44 is not to be utilized for the transfer request, then the arbitrator 108 determines whether a class 1 connection is to be established on the MDN 42, as is indicated at a flow chart block 137 ("isSOFc1?"). If a class 1 connection is to occur, then the arbitrator exhibits the functionality and performs the methodology set forth in FIG. 9, as indicated at flow chart 138.

Next, the arbitrator 108 employs a destination fairness insurance mechanism 130' relative to the destination port as a destination. As indicated in a flow chart block 139 ("nextDP[dp]=SOFc1?"), a determination is made as to whether the next-in-line destination indicator corresponding to the destination port of the transfer request denotes a class 1 connection. If it does, then the transfer request is denied, as indicated in a flow chart block 141 ("dpNotFree"), because a prior request has priority.

If the next-in-line destination indicator does not specify a destination port, then as indicated at the flow chart block 142, the arbitrator 108 sets the next-in-line destination indicator to designate the present queue being serviced, i.e., to designate that a frame in that port's queue is next-in-line.

The arbitrator 108 next employs a source fairness insurance mechanism 130" for the source port as a source. If a previous request was directed to the same source port as a source, then it is granted access before the present request. Otherwise, the present request is granted access to the particular source port as a source. More specifically, at flow chart block 143 ("nextSP[sp]!=NULL && nextSP[sp]!=dp?"), a determination is made as to whether the next-in-line indicator for the source port designated by the present transfer request is empty or has a next-in-line port already designated. If already designated, then access to the source port is denied, as indicated by flow chart block 144 ("spNotFree"). If empty, then the next-in-line source indicator for the source port is set to correspond to the destination port designated in the transfer request and presently being serviced ("nextSP[sp]=dp").

Next, a determination is made as to whether the present source port is ready to send data, as noted at flow chart block 146 ("sP Free[sp]?"). Essentially, the rxready signal from the particular source port is examined. If not ready, then the source port is not ready and the transfer request is denied, as indicated at flow chart block 144 ("spNotFree"). If ready, then the arbitrator 108 performs rate matching. The rate matching feature is optional in the present invention and requires the ability to manipulate throughput rate through the switch 30 (FIG. 2). The rate at which data is transported through the switch 30 (FIG. 2) can be manipulated by providing a series of parallel data buses in the MDN 42 and by selecting how many buses of the MDN 42 which will concurrently transport data.

The rate matching methodology is performed as noted at flow chart blocks 147 through 149. If the bit rate of the source port is greater than the bit rate of the destination port, then the bit rate for the transfer through the MDN 42 is set at the destination port rate. Otherwise, the rate is set at the source port rate. Finally, access to the MDN 42 is granted, as indicated at the conclusory flow chart block ("grantMDN").

FIG. 7 illustrates the methodology set forth at flow chart block 134, involving a request to access the EC 58. An access to the EC 58 occurs through the IDN 44. Initially, as shown in FIG. 7, a determination is made as to whether the EC 58 is the intended source port or destination port, as denoted at flow chart block 151 ("EC=dp?"). In the case when the EC 58 is the intended destination port, a source fairness insurance mechanism 130" is employed relative to the source port as a source to insure fairness. If a previous request was directed to the same source port as a source, then it is granted access before the present request. Otherwise, the present request is granted access to the particular source port as a source.

In this regard, a determination is made as to whether the next-in-line source indicator for the EC (source port) is empty or has already been designated, as is indicated at the flow chart block 152 ("nextSP [sp]!=NULL && nextSP [sp]!=dp?"). If already designated, then the request is denied, as indicated at flow chart block 153 ("ImixNot-Free"). If empty, then the next-in-line source indicator for the EC 58 is set to the present request, as denoted at flow chart block 154 ("nextSP [sp]=dp").

Next, an inquiry is made as to whether the IDN 44 is ready ("ImixRx[sp]?") and whether the source port is ready ("sPFree[sp]?"). If not ready, then access to the IDN 44 is denied, as denoted at flow chart block 153 ("ImixNotFree"). If ready, then a determination is made as to whether the request involves a class 1 data transfer, as indicated at a flow chart block 156 ("isSOFc1?"). If a class 1 data transfer is not to be established, then the transfer request is granted access to the IDN ("grantIDN") and a class 2 data transfer ensues. If a class 1 transfer is to be achieved, then a flag is set by the arbitrator 108, which is forwarded to switch module 36 for setting up the switch module 36 for the bidirectional class 1 data flow, and then access to the IDN 44 is granted ("grantIDN").

Referring back to flow chart block 151, if the EC 58 is to be the source ports then a determination is made as to whether the destination port is utilizing the IDN or is involved in a class 1 transfer already, as indicated at a flow chart block 158 ("dPImix is SOFc1 and class1[dp]?"). If either of the foregoing is answered in the affirmative, then the transfer request is denied, as noted at flow chart block 159 ("dpNotFree"). If answered in the negative, then the process continues to flow chart block 161.

Commencing with the flow chart block 161, the arbitrator 123 employs a destination fairness insurance mechanism 130' relative to the EC 58 (i.e., destination port) as a destination. As set forth in block 161, an inquiry is made as to whether the next-in-line destination indicator corresponding to the destination port designates a class 1 data transfer from a previous transfer request. If so, then the request is denied, as indicated at flow chart block 159 ("spNotFree"). If not, then the next-in-line destination indicator corresponding with the EC 58 is set to the .destination queue of the present transfer request, as noted at flow chart block 162 ("nextDP[dp]=dstQ").

Further, a determination is made as to whether the IDN 44 is available to transfer data to the destination port, as indicated at a flow chart block 163 ("imixTx[dp]?"). In essence the txready signal corresponding to the destination port and from the IDN 44 is examined. If not available, then access is denied, as indicated at flow chart block 164 ("ImixNotFree"). If available, then a determination is made as to whether a class 1 transfer is to be established, as indicated at flow chart block 165 ("isSOFc1?"). If a class 1 connection is to be established, then a flag is set to configure the switch module 36, as indicated at flow chart block 166 ("class1[dp]=1"), and access to the IDN 44 is granted ("grantIDN"). Otherwise, a class 2 connection ensues through the IDN 44.

Figure 8:
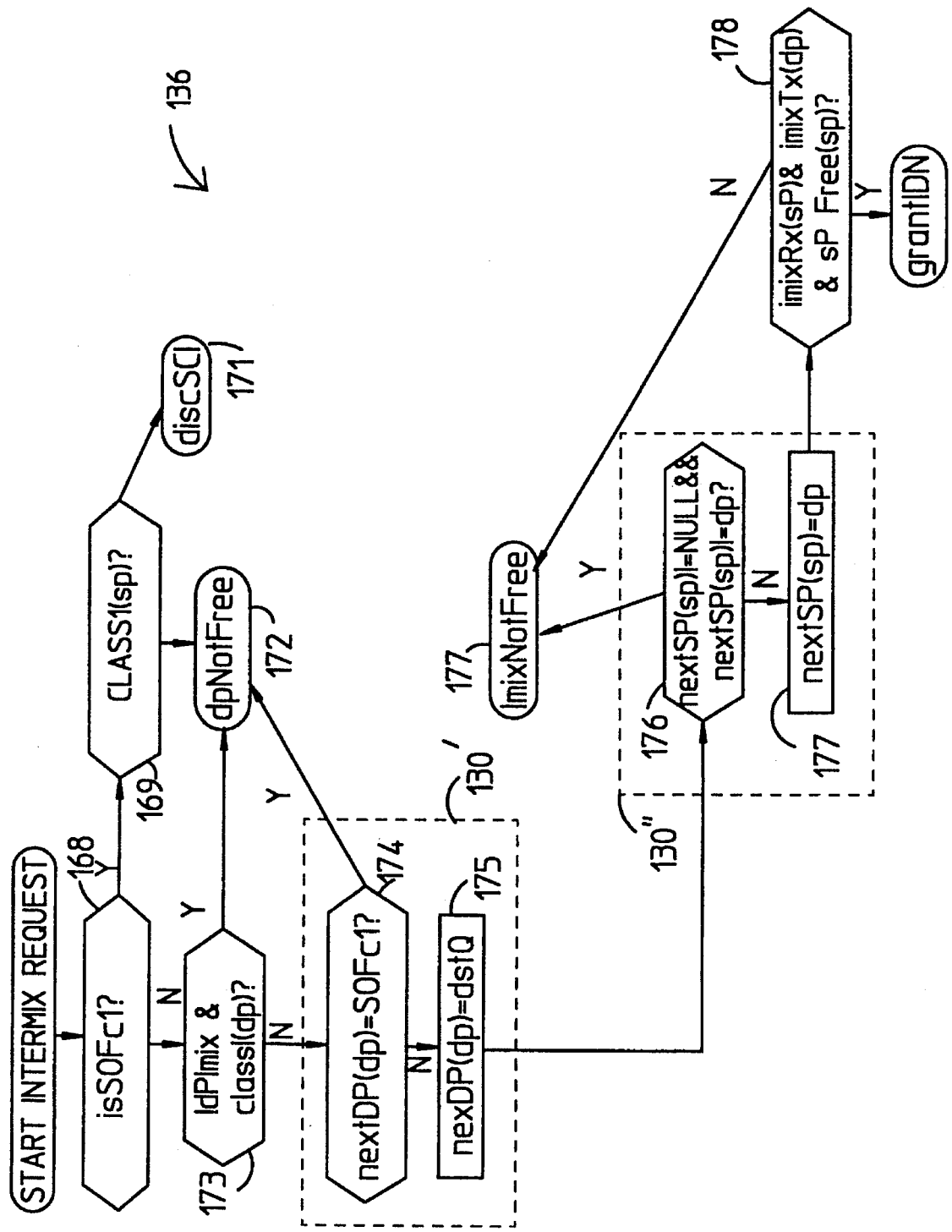
FIG. 8 is a flow chart illustrating the architecture and the functionality of the arbitrator of FIG. 4 in relation to an intermix distribution network (IDN) of FIG. 3.

The methodology for accessing the IDN 44 is set forth at in FIG. 8 and is described hereafter. Initially, a determination is made as to whether the transfer request involves either a class 1 or class 2 transfer, as indicated at a flow chart block 168 ("is SOFc1?"). If a class 1 transfer is sought, then a determination is made as to whether the source port is already in a class 1 transfer, as indicated in a flow chart block 169 ("class[sp]?"). If so, then the request is in error and the request will be denied, as noted at flow chart block 171 ("discSCI"). If the source port is not in a class 1 connection as determined at the flow chart block 169, then access is denied because the destination port is not free, as noted at flow chart block 172 ("spNotFree").

When a class 2 connection is to be established, as determined in flow chart block 168, then an inquiry is next made as to whether the destination port is involved in either an intermix or class 1 transfer, as indicated at a flow chart block 173 ("!dPImix & class1[dp]?"). If the answer is yes, then the transfer request is denied, based upon the unavailability of the destination port, as denoted at flow chart block 172 ("dpNotFree").

If the answer is no, then the arbitrator 123 employs a destination fairness insurance mechanism 130' to insure fairness relative to the destination port as a destination. If a prior request has been made to use the destination port as a destination, then it will be granted prior to the present transfer request. In this regard, an inquiry is made as to whether the next-in-line destination indicator corresponding with the destination port of the transfer request indicates a class 1 transfer, as denoted at flow chart block 174 ("nextDP [dp]=SOFc1?"). If yes, then the destination port is not free ("dpNotFree") and the instant transfer request is denied. If no, then the process continues and the next-in-line destination indicator for the destination port is set for the present queue indicated in the instant transfer request, as is indicated in flow chart block 175 ("nextDP[dp]=dstQ").

A source fairness insurance algorithm 130" now determines fairness relative to the source port as a source. If a previous request was directed to the same source port as a source, then it is granted access before the present request. Otherwise, the present request is granted access to the particular source port as a source. More specifically, as indicated at flow chart block 176 ("nextSP[sp]!=NULL && nextSP[sp]!=dp?"), a determination is made as to whether the next-in-line source indicator for the source port identified by the transfer request is empty or has already been assigned. If already assigned, then the IDN 44 is unavailable and the transfer request is denied, as denoted at flow chart block 177 ("ImixNotFree"). If empty, then the next-in-line source indicator is set to the destination port identified by the present transfer request, as indicated at the flow chart block 177 ("nextSP[sp]=dp").

Finally, a determination is made as to whether the IDN 44 is now available to transport data from the particular source port to the particular destination port and as to whether the source port is now free, as indicated at a flow chart block 178 ("imixRx[sP] & imixTx[dP] & sP Free[sp]?"). In this regard, the rxready of the IDN 44 corresponding to the source port and the txready of the IDN 44 corresponding to the destination port are examined. If so, then the request is granted access to the IDN 44 ("grantIDN"). If not, then the transfer request is denied, as indicated at flow chart block 177 ("ImixNotFree").

The methodology for implementing a request for a class 1 connection is set forth in the flow chart of FIG. 9 and is described hereafter. Initially, commencing with flow chart block 181 ("nextDP[dp]=SOFc1?"), the arbitrator 123 employs a destination fairness insurance mechanism 130' to insure fairness of the destination port as a destination. Specifically, a determination is made as to whether the next-in-line destination indicator for the destination port is already set for a class 1 connection. If so, then access to the particular destination port and the transfer request are denied, as indicated at a flow chart block 182 ("dpNotFree"). If the destination port is not presently involved in a class 1 connection in accordance with the destination port indicator, then the next-in-line destination indicator for the destination port is set for the present queue associated with the transfer request, as denoted at flow chart block 183 ("nextDP[dp]= dstQ").

Next, the arbitrator 123 employs a destination fairness insurance mechanism 130' to insure fairness of the source port as a destination. In this regard, an inquiry is made as to whether the next-in-line destination indicator for the source port identified by the present transfer request is set for the present destination queue from which the present transfer request originated, as indicated at flow chart block 184 (""nextDP[sp]=dstQ?"). If so, then the source port is not free and the transfer request is denied, as indicated at flow chart block 185 ("spNotFree"). If not, then the next-in-line destination indicator for the present source port is specified as a class 1 transfer, as noted at flow chart block 186.

Further, a source fairness insurance mechanism 130" is now employed relative to the destination port as a source. A determination is made as to whether the next-in-line source indicator for the destination port is empty or is already designated for a destination port, as noted at flow chart block 187 ("nextSP[dp]!=Null && nextSP[dp]!=DP?"). If yes, then access to the source port is denied by denying the transfer request at block 182 ("dpNotFree"). If not already designated, then the next-in-line source indicator for the destination port is set to the present destination port of the instant transfer requests as noted at flow chart block 188 ("nextSP[dp]=dp").

Next, a source fairness insurance mechanism 130" is next performed relative to the source port as a source. The algorithm commences at flow chart block 189, where it is determined whether the next-in-line source indicator for the source port is empty or occupied. If occupied, then the source port is not free and the transfer request is denied, as indicated at flow chart block 185 ("spNotFree"). If empty, then the next-in-line source indicator for the source port is set for the present destination port of the transfer request, as noted at block 191 ("nextSP[sp]=dp").

As indicated at a flow chart block 192, it is determined whether the source port is ready as a destination port ("sP Free[sp]?") and whether the destination port is ready as a source port ("spFree[dp]?"). If not, then the transfer request is denied, as indicated at flow chart block 185 ("spNotFree"). If so, then as indicated at flow chart block 193, it is determined whether the source port is ready as a destination port ("dPFree[sp]?"). If not, then the transfer request is denied, as denoted at flow chart block 182 ("dpNotFree"). Otherwise, the transfer request is granted ("grantMDN") and access to the MDN 42 ensues.

The closer 128 is implemented with any suitable logic, preferably a state machine(s) implemented with a commercially available FPGA. The closer 128 monitors the transfer status ready signals (xfer ready; indicates when status information is ready and not ready to be transferred) corresponding with the ports 33 via connection 131 to the CDN 43. The closer 128 interfaces to the sequencer 101 in order to execute CDN switch commands and to execute destination port commands for a collection of status information. The closer 128 further collects frame statistics and delivers an increment count command to the EC interface 133. The statistics and increment count can be used by high level optimization algorithms to optimize network performance and network management.

The EC interface 133 is implemented with any conventional processing mechanism, such as a DSP. It interfaces the path allocation system 50 to the element controller 58 (FIG. 2) via a serial connection 135. The EC interface 133 accepts commands from the element controller 58, builds packets from the commands, maintains and accesses the path allocation system's memory to execute read or write commands from the element controller 58, sends commands to the sentry 104 in order to change address validation table information, and sends commands to the timer 108 through the dedicated serial port 135.

OPERATION

The overall operation of the fiber optic switch 30 with the novel path allocation system 50 will now be described with reference to FIGS. 1 through 4 and, particularly, to a class 2 data transfer where a new data frame is routed through the fiber optic switch 30 and to a class 1 data transfer where a bidirectional reserved data path is established between ports 33.

Initially, a data frame is forwarded to the receive memory 84 of a channel module 32 from a source port (p1–pi) 33. The status/control logic 85 associated with the source port 33 outputs an rxready signal to the status MUX 41, which forwards the rxready signal to the sentry 104. Based upon the rxready signal, the sentry 104 recognizes that a new frame is available and asks the sequencer 101 to request path data from the status/control logic 85 associated with the source port 33 from which the new frame was received. The path data includes a source identification (SID), a buffer number indicating the location of the frame in receive memory 84, a destination port identification (DID), and a class indicator (class 1 or 2).

In this regards the sequencer 101 communicates a sequence of control commands to the CDN 43 in order to set up the CDN for causing the status/control logic 85 associated with the source port 33 to forward the path data corresponding to the new frame. The CDN 43 then causes the path data for the new frame to be transferred from the status/control logic 85 to the sentry 104. The sentry 104 validates the SID and maps the DID to a specific destination port 33. If either the DID or SID is invalid, a reject frame signal is queued in the status/control logic 85 instead of the frame itself.

The sentry 104 informs both the timer 108 and the scheduler 118 of the presence of the new frame. The timer initiates the fbsy/del clock. Moreover, the sentry 104 sends an add signal to the scheduler 118. The scheduler 118 determines which destination queue to utilize based on the destination port indicator associated with the add signal from the sentry 104. A tail base pointer address in the add signal is utilized for accessing the tail of the particular destination queues which is where the path data corresponding to the new frame is added. The scheduler 118 uses the source port indicator, the source buffer number (in a receive memory 84), and class indicator to generate a queue entry in the particular destination queue, which is placed at the tail of the particular destination queue 121.

In the event that the fbsy time period expires at the timer 108 before the timer 108 receives the timer clear signal from the arbitrator 123, the timer 108 will forward an fbsy signal to the sentry 104, which in turn will send an fbsy signal to the scheduler 118. At this point, the scheduler 118 takes the queue entry associated with the fbsy signal and moves the queue entry to the queue corresponding to the source port 33 where the data originated, so that the data is eventually returned to the source port 33 from which it came.

If the predetermined delete time period expires at the timer 108 prior to the time that the timer 108 receives the timer clear signal from the arbitrator 123, then the timer 108 will forward a delete signal to the glue logic 113, which in turn will forward a delete signal to the scheduler 118. At this point, the scheduler 118 will delete the queue entry associated with the expired delete time period (which was previously put in the queue 121 corresponding to the source port 33 of origination).

As queue entries are introduced into the queues 121 by the scheduler 118, the scheduler 118 is also concurrently routing transfer requests to the arbitrator 123 for particular data connections and destination ports 33. The scheduler 118 receives a next destination port signal from the glue logic 113, and accordingly, the scheduler 118 retrieves the queue entry at the head of the queue corresponding to the next destination port 33. The scheduler 118 then sends a transfer request to the arbitrator 123 corresponding to the retrieved queue entry.

The arbitrator 123 continuously monitors the status signals (rxready, intermix ready, intermix bus ready, and txready) from the source and destination port intelligence mechanisms 73 and determines whether the particular source and destination ports 33 are ready to exchange data. The arbitrator 123 determines whether the transfer is either class 1 or class 2. If class 1, then the arbitrator 123 determines if both the particular source port 33 and the destination port 33 are available for both transmitting and receiving data, because a class 1 transfer requires a reserved path. If class 2, then the arbitrator 123 determines whether the particular source port 33 is ready to transfer (i.e., rxready for source port 33 is asserted) and whether the particular destination port 33 is available for receiving the new frame (i.e., txready for the destination port 33 is asserted).

When the ports 33 are not ready to make the transfer (either class 1 or class 2), then the arbitrator 123 refuses the scheduler's transfer request, and the scheduler 118 revisits the transfer request later, until the transfer request is ultimately granted. Significantly, the arbitrator 123 employs various fairness insurance mechanisms for insuring that all transfer requests are timely serviced.

Once a class 1 transfer request has been granted by the arbitrator 123, the arbitrator 123 configures the MDN 42 (or the IDN 44) so that the MDN 42 (or the IDN 44) reserves a data path and connects the appropriate source port 33 to the appropriate destination port 33. Moreover, once a class 2 transfer request has been granted by the arbitrator 123, the arbitrator 123 configures the MDN 42 (or the IDN 44) so that the new data frame is channeled from the receive memory 84 associated with the source port 33 to the appropriate destination port 33.

Upon the granting of either a class 1 or class 2 data transfer, the sequencer 101 informs the particular status/control mechanism 85 corresponding to the destination port 33 to expect data so that the mechanism 85 can set up accordingly. The arbitrator 123 also forwards a scheduler clear signal to the scheduler 118 so that the scheduler 118 eliminates the associated queue entry from the corresponding destination queue, and also forwards a timer clear signal to the timer 108 to clear the timer's internal fbsy/del clock corresponding to the frame. Moreover, after the timer 108 clears its clock, the timer 108 forwards a control signal to the status/control logic 85 associated with the source port 33 to ultimately cause the receive memory 84 to forward the new frame (or perhaps a frame rejection signal) to the switch module 36 and then the destination port 33.

The closer 128 finishes the frame transfer by insuring that the transfer has occurred and by collecting the statistics on the transfer. The closer 128 requests the transfer status through the sequencer 101 regarding the transfer of the frame through the sequencer 101. In turn, the destination port intelligence mechanism 73 advises the closer 128 of the status. The status information can include at least the following: CRC error, null frame, fbsy, reject frame (bad SID or DID), SOFc1, intermix, and source port number. The closer 128 then instructs the EC interface 133 to increment a count, and the EC interface 133 increments the appropriate count.

It will be obvious to those skilled in the art that many variations and modifications may be made to the preferred embodiment of the path allocation system 50 and associated methodology as well as the fiber optic switch 30 without substantially departing from the principles of the present invention. All such variations and modifications are intended to be included herein within the scope of the present invention, as set forth in the following claims.

Wherefore, the following is claimed:

1. A path allocation system for high performance data transfer through a fiber optic switch which selectively interconnects fiber optic channels, comprising:

a plurality of ports for connection to said channels;

a memory means associated with said ports, said memory means for storing an incoming new data frame from a source port;

a distribution network configured to interconnect said ports;

a sentry in communication with said memory means, said sentry configured to determine when said new data frame has been received by said memory means;

a scheduler which maintains a destination queue corresponding with each of said ports, said scheduler configured to receive path data pertaining to said new data frame from said sentry after said sentry determines receipt of said new data frame, said path data including a source port indicator which identifies a source port and which identifies a memory address identifying a location of said frame in said memory means, and a destination port indicator which identifies a destination port, and said scheduler configured to place said path data within a destination queue corresponding with said destination port and to retrieve said path data from said destination queue;

an arbitrator configured to control said distribution network and in communication with said scheduler and said ports, said arbitrator configured to determine when said ports are busy servicing other frame transfer requests and when said ports are available for accommodating frame transfer requests, and said arbitrator configured to deny and grant said transfer requests based upon availability; and a source fairness insurance means associated with said source port, said source fairness insurance means for defining an order for future access to said source port as a source for data, said order including at least one destination port corresponding to a denied transfer request.

2. The system of claim 1, wherein said order is specified by said source fairness insurance means to include said destination port pertaining to said transfer request when said source port is busy and when no other transfer requests directed to said source port preceded said transfer request after said busy condition.

3. The system of claim 1, wherein said source fairness insurance means is a next-in-line source indicator which identifies only a single source port to define said order.

4. The system of claim 1, wherein said arbitrator further comprises a class determination means for determining whether said transfer request is directed to establishing a packet transfer and a reserved path transfer and wherein when said reserved path transfer is established, said arbitrator determines the availability of said destination port to both receive and transmit data and the availability of said source port to transmit data.

5. The system of claim 1, wherein said new data frame establishes a reserved data path in said distribution network for a circuit switching data transfer.

6. The system of claim 1, further comprising a destination fairness insurance means associated with said destination port, said destination fairness insurance means for defining another order for future access to said destination port as a destination for data, said another order including at least one source port corresponding to another denied transfer request directed to said destination port.

7. The system of claim 1, further comprising a destination fairness insurance means associated with said source port, said destination fairness insurance means for storing another order for future access to said source port as a destination for data, said another order including at least one source port corresponding to another denied transfer request directed to said source port.

8. The system of claim 1, further comprising another source fairness insurance means associated with said destination port, said another source fairness insurance means for defining another order for future access to said destination port as a source for data, said another order including at least one destination port corresponding to a denied transfer request.

9. The system of claim 3, wherein said next-in-line source indicator is configured so that after being assigned said single source port, said next-in-line source indicator does not identify subsequent source ports corresponding with subsequent frame transfer requests directed to said source port.

10. The system of claim 3, wherein said scheduler is configured to service said destination queues in a predetermined queue service order.

11. The system of claim 6, wherein said destination fairness insurance means is a next-in-line destination indicator which stores only a single source port indicator to define said another order.

12. The system of claim 7, wherein said destination fairness insurance means is a next-in-line destination indicator which stores only a single source port indicator to define said another order.

13. The system of claim 8, wherein said another source fairness insurance means is a next-in-line source indicator which stores only a single destination port indicator to define said another order.

14. The system of claim 10, wherein said predetermined queue service order is sequential.

15. A path allocation system for high performance data transfer through a fiber optic switch which selectively interconnects fiber optic channels, comprising:

a plurality of ports for connection to said channels;

a memory means associated with said ports, said memory means for storing an incoming new data frame from a source port;

a distribution network configured to interconnect said ports;

a sentry in communication with said memory means, said sentry configured to determine when said new data frame has been received by said memory means;

a scheduler which maintains a destination queue corresponding with each of said ports, said scheduler configured to receive path data pertaining to said new data frame from said sentry after said sentry determines receipt of said new data frame, said path data including a source port indicator which identifies a source port and which identifies a memory address identifying a location of said frame in said memory means, and a destination port indicator which identifies a destination port, and said scheduler configured to place said path data within a destination queue corresponding with said destination port and to retrieve said path data from said destination queue;

an arbitrator configured to control said distribution network and in communication with said scheduler and said ports, said arbitrator configured to determine when said ports are busy servicing other frame transfer requests and when said ports are available for accommodating frame transfer requests, and said arbitrator configured to deny and grant said transfer requests based upon availability; and a destination fairness insurance means associated with said destination port, said destination fairness insurance means for storing an order for future access to said destination port as a destination for data, said order including at least one source port indicator corresponding to a denied transfer request.

16. The system of claim 15, wherein said destination fairness insurance means is a next-in-line source indicator which identifies only a single source port to define said order and, after being assigned said single source port, does not identify subsequent source ports corresponding with subsequent frame transfer requests directed to said source port, and wherein said scheduler is configured to service said destination queues in a predetermined queue service order.

17. A method for insuring efficient and reliable transfer of data through a fiber optic switch for selectively interconnecting fiber optic channels which are connected to the switch via respective ports, comprising the steps of:

receiving data at said switch from a source port, said data to be switched to a destination port;

determining when said destination port is available to receive said data and when said destination port is busy receiving other data;

when said source and destination ports are available, transferring said data from said source port to said destination port;

when either of said source and destination ports is busy, denying transfer of said data from said source port to said destination port;

defining an order for future access to said source port as a source for data, said order including a designation of at least one destination port corresponding to at least one denied transfer request;

defining another order for future access to said source port as a destination for data, said another order including a designation of at least one destination port corresponding to at least one other denied transfer request; and after said source port terminates said busy condition, permitting a denied transfer request by acquiring a destination port designation based upon said order.

18. The method of claim 17, wherein said order includes only a single destination port.

19. The method of claim 17, further comprising the step of maintaining a corresponding destination queue for each of said ports directed to queuing transfers through said switch from source ports to destination ports.

20. The method of claim 17, further comprising the steps of:

determining whether said transfer request is directed to establishing a packet transfer;

determining whether said transfer request is directed to establishing a reserved path transfer; and when said transfer request is directed to establishing said reserved path transfer, further determining the availability of said destination port to transmit data.

21. The method of claim 17, further comprising the step of defining another order for future access to said destination port as a source for data, said another order including a designation of at least one destination port corresponding to at least one other denied transfer request.

22. The method of claim 18, wherein said single destination port corresponds to a next transfer request immediately following a granted request which resulted in said busy condition.

23. The method of claim 19, wherein said destination queues are serviced in a predetermined queue service order.

24. The method of claim 23, wherein said predetermined queue service order is sequential.

25. A method for insuring efficient and reliable transfer of data through a fiber optic switch for selectively interconnecting fiber optic channels which are connected to the switch via respective ports, comprising the steps of:

receiving data at said switch from a source port, said data to be switched to a destination port;

determining when said destination port is available to receive said data and when said destination port is busy receiving other data;

determining when said source port is available to transmit said data and when said source port is busy transmitting other data;

when said source and destination ports are available, transferring said data from said source port to said destination port;

when either of said source and destination ports is busy, denying transfer of said data from said source port to said destination port;

defining an order for future access to said destination port as a destination for data, said order including a designation of at least one source port corresponding to at least one denied transfer request; and permitting a denied transfer request by acquiring a stored source port designation based upon said order.

26. A method for insuring efficient and reliable transfer of data through a fiber optic switch for selectively interconnecting fiber optic channels which are connected to the switch via respective ports, comprising the steps of:

receiving data at said switch from a source port, said data to be switched to a destination port;

determining when said destination port is available to receive said data and when said destination port is busy receiving other data;

when said source and destination ports are available, transferring said data from said source port to said destination port;

when either of said source and destination ports is busy, denying transfer of said data from said source port to said destination port;

defining an order for future access to said source port as a source for data, said order including a designation of at least one destination port corresponding to at least one denied transfer request; and after said source port terminates said busy condition, permitting a denied transfer request by acquiring a destination port designation based upon said order; and defining another order for future access to said destination port as a destination for data, said another order including a designation of at least one source port corresponding to at least one other denied transfer request.

* * * * *